3,213,144
PRODUCTION OF 2-(ETHYLTHIO)ETHANOL

Edward J. Horning and John T. Middlebrook, Phillips, Tex., assignors to Phillips Petroleum Company, a corporation of Delaware
No Drawing. Filed June 22, 1962, Ser. No. 204,609
3 Claims. (Cl. 260—609)

This invention relates to a process for the production of 2-(ethylthio)ethanol.

Organic sulfur compounds are of considerable industrial importance and processes for obtaining them economically from readily available chemicals are of considerable utility. Among these sulfur compounds is that of 2-(ethylthio)ethanol, a highly reactive compound useful as a solvent and as a chemical intermediate for the production of resins, rubbers, plastics and as intermediates for systemic insecticides.

2-(ethylthio)ethanol may be prepared by reacting ethyl mercaptan with ethylene oxide:

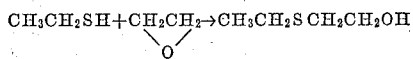

This reaction is exothermic and, in the absence of catalysts, proceeds at a very slow rate. At high temperatures this reaction results in the production of undesirable by-products ("heavies' 'such as high boiling polymers and sulfides) and can become uncontrollable and even expo-sive.

Accordingly, an object of this invention is to provide an improved process for the production of 2-(ethylthio)-ethanol. Another object is to produce 2-(ethylthio)-ethanol at a high reaction rate and produce the product in high yields with high purity. Further objects and advantages of this invent ion will become apparent to those skilled in the art from the following discussion and appended claims.

The reaction of ethylene oxide and ethyl mercaptan to produce 2-(ethylthio)ethanol is improved according to this invention by carrying it out in the presence of ammonium hydroxide in an amount sufficient to promote the reaction. The production of 2-(ethylthio)ethanol in this manner results in a high yield of 2-(ethylthio)ethanol with high purity. The reaction in such a process is carried out without resort to high temperatures and it results in a minimum, if any, production of undesirable by-products. The reaction has a minimum induction period, and can be completed in a relatively short time, for example, as compared to carrying it out in the absence of ammonium hydroxide or an insufficient amount thereof, in the presence of only water, or in the presence of only anhydrous ammonia.

The amount of ammonium hydroxide used in this invention, stated functionally, is that amount sufficient to promote the reaction between ethylene oxide and ethyl mercaptan to produce 2-(ethylthio)ethanol, i.e., an amount sufficient to increase the reaction rate. Generally, the amounts of this reaction promoter or catalyst, in terms of ammonia and water, which will be generally applicable are from 2 to 10 weight percent ammonia and 2 to 10 weight percent water, based on the ethyl mercaptan reactant.

Usually a stoichiometric amount of ethylene oxide is used, i.e., one mole of ethylene oxide per mole of ethyl mercaptan, though as low as 80 percent of the stoichiometric amount of ethylene oxide can be used since high temperatures sometimes may be encountered near the end of the reaction, where sufficient cooling capacity may not be available, with consequent production of undesirable by-products. Since the reaction is exothermic, the ethylene oxide is preferably added incrementally to the ethyl mercaptan-ammonium hydroxide mixture, e.g., the ethylene oxide is fed at a feed rate sufficient to maintain in the reactor about 0.1 to 0.2 mole of ethylene oxide per mole of ethyl mercaptan. As such, the reaction is in effect operated on pressure control. Any suitable types of cooling means can be used to maintain the reaction at desired temperatures and pressures, e.g., 150 to 200° F. and 45 to 70 p.s.i.g.

The process of this invention is particularly applicable to a bath type operation, and per pass yields of 70 to 90 mole percent and ultimate yields of 95 mole percent and higher based on ethylene oxide can be achieved. 2-(ethylthio)ethanol purities as high as 98 to 99 weight percent can be readily achieved by fractionally distilling the reaction effluent.

The following examples further illustrate the objects and advantages of this invention, but it should be understood that this invention is not to be limited unduly to the reaction conditions, amounts of reactants, etc. recited in these examples.

EXAMPLES

A number of runs were carried out in which ethylene oxide and ethyl mercaptan were reacted in the presence or absence of certain materials, namely water, anhydrous ammonia, and ammonium hydroxide. These runs were carried out in a 1-liter stainless steel jacketed autoclave equipped with a motor driven stirrer and elctrical heater.

In these runs, ethyl mercaptan and, where used, water, anhydrous ammonia, or ammonium hydroxide, were charged to the reactor, after which the reactor contents were agitated and heated to 150° F. Air was then bled from the reactor until a little ethyl mercaptan was taken overhead. An amount of ethylene oxide was then pressured into the reactor, via a Rotometer, and allowed to react for about 1 hour. After this time, the reactor was sampled and the composition of the sample determined using a temperature programmed chromatographic analyzer. In those runs where analysis of the reaction mixture indicated substantially no or little reaction, the run was terminated. If such analysis indicated initiation of the reaction, further ethylene oxide was fed into the reactor at a rate such that the temperature and pressure could be kept within desired operating range, i.e. below 200° F. and 45 to 70 p.s.i.g. pressure. After the stoichiometric amount of ethylene oxide or the amount which would react was fed into the reactor, the reaction effluent was analyzed to determine its composition. These runs and results obtained are summarized in Table I.

Table I

|  | Runs | | | | | | | |
|---|---|---|---|---|---|---|---|---|
|  | 1 | 2 | | | 3 | | 4 | 5 |
| Charge: | | | | | | | | |
| Ethylene oxide, moles | 2 | 1.6 | 3.2 | 5.8 | 1.5 | 2.6 | 1.5 | 6 |
| Ethyl mercaptan, moles | 5.8 | 5.8 | 5.8 | 5.8 | 5.8 | 5.8 | 5.8 | 5.8 |
| Oxide/mercaptan mole ratio | 0.34 | 0.28 | 0.55 | 1.0 | 0.26 | 1.45 | 0.26 | 1.03 |
| Water, wt. percent of mercaptan | 0 | 1.5 | 1.5 | 1.5 | 0 | 0 | 1 | 2.5 |
| Ammonia, wt. percent of mercaptan | 0 | 0 | 0 | 0 | 1.1 | 1.1 | 1 | 2.8 |
| Reaction conditions: | | | | | | | | |
| Reaction time, hrs | 3.75 | 2.0 | 2.75 | 3.5 | 1.0 | 2.6 | 1.0 | 1.5 |
| Reaction temperature, °F | 142–177 | 149–177 | 152–175 | 156–193 | 151–152 | 151–152 | 149–150 | 149–182 |
| Reaction pressure, p.s.i.g | 20.5–54 | 25.5–52 | 21.5–37.5 | 0–21 | 47–54.5 | 49.7–54.5 | 42–52.5 | 63.0 |
| Composition of affluent, wt. percent: | | | | | | | | |
| Lights | 0 | 0 | 0 | 0 | trace | trace | trace | 0.1 |
| Ethylene oxide | 12.3 | 8.7 | 4.8 | 4.3 | 0 | 1.7 | 13.8 | 0.4 |
| Ethyl mercaptan | 69.3 | 68.6 | 38.1 | 0.2 | 71.7 | 48.0 | 80.1 | 0.1 |
| Water | 0.4 | 0.5 | 0.4 | 0.3 | 0.5 | 0.4 | 0.5 | 0.3 |
| Diethyl sulfide | 0.2 | 0.1 | 0.7 | 1.9 | 0.1 | 0.2 | trace | 0.2 |
| Diethyl disulfide | 0.7 | 1.4 | 0.8 | 0.5 | 0.9 | 0.8 | 0.8 | 0.4 |
| Unidentified | trace | 0 | 0 | 0 | 0 | 0 | 0 | 0 |
| Heavies | 0.1 | 0.1 | 0.3 | 1.6 | trace | 0.1 | trace | 0.1 |
| 2-(Ethylthio)ethanol | 17.0 | 20.6 | 54.9 | 91.2 | 26.8 | 48.8 | 4.8 | 98.4 |

The data in Table I show, first of all, that when the reaction of ethylene oxide and ethyl mercaptan was carried out in the absence of other material, viz., Run 1, the reaction proceeded at a very slow rate, as evidenced by the fact that it took 3.75 hrs. of reaction time to produce an effluent with only 17.0 wt. percent 2-(ethylthio)ethanol and 12.3 wt. percent unreacted ethylene oxide. In Run 2, where the reaction was carried out in the presence of water, it took 3.5 hrs. of reaction time to produce 91.2 wt. percent 2-(ethylthio)ethanol, and then only with the concurrent production of an undesirable amount of by-products, viz heavies, 1.6 wt. percent, and diethyl sulfide, 1.9 wt. percent; note also that the effluent contained 4.8 wt. percent of unreacted ethylene oxide. In Run 3, where the reaction was carried out in the presence of anhydrous ammonia, the reaction rate was very slow, as evidenced by the low reaction temperature of 151 to 152° F. (practically all of the heat of reaction being dissipated by the reactor), and at the end of 2.6 hrs. of reaction time an effluent with only 48.8 wt. percent of 2-(ethylthio)ethanol was produced. In Run 4, where the reaction was carried out in the presence of 1 weight percent each of water and and ammonia, based on the mercaptan, the reaction rate was very slow as evidenced again by the low reaction temperature of 149–150° F. and after 1 hour of reaction time an effluent with only 4.8 wt. percent of 2-(ethylthio)-ethanol was produced, and note that the effluent contained 13.8 wt. percent unreacted ethylene oxide. In Run 5, where the reaction was carried out in the presence of larger amounts of ammonia hydroxide sufficient to promote the reaction, according to the practice of this invention, the reaction proceeded at a very high rate, as evidenced by the reaction temperature and pressure and the fact that after only 1.5 hrs. of reaction time an effluent with 98.4 wt. percent of 2-(ethylthio)ethanol was produced. Note also that in the effluent of Run 5 only 0.1 wt. percent of heavies were produced.

Various modifications and alterations of this invention will become apparent to those skilled in the art from the foregoing discussion without departing from the scope and spirit of this invention.

We claim:

1. A process for preparing 2-(ethylthio)ethanol, which comprises reacting ethylene oxide and ethyl mercaptan in the presence of an amount of ammonium hydroxide promoter sufficient to increase the reaction rate, and recovering 2-(ethylthio)ethanol from the resulting reaction mixture.

2. The process according to claim 1, wherein said promoter is present in the range of 2 to 10 weight percent each of water and ammonia, based on the weight of said ethyl mercaptan.

3. The process according to claim 2, wherein said reaction is carried out at temperatures in the range of 150 to 200° F., and pressures in the range of 45 to 70 p.s.i.g.

References Cited by the Examiner

UNITED STATES PATENTS 2,129,709  9/38  Schuette et al. _____ 260—609
2,570,050  10/51  Eby _____ 260—609

OTHER REFERENCES

Reid: Organic Chemistry of Bivalent Sulfur, vol. II, page 207 (1960), Chemical Publishing Co. Inc., New York, N.Y.

CHARLES B. PARKER, *Primary Examiner.*

DANIEL D. HORWITZ, *Examiner.*